May 11, 1937.  T. TOGNOLA  2,080,018

MAGNETIC ROTOR

Filed Feb. 27, 1936

INVENTOR.

Tullio Tognola
Clinton S. James
ATTORNEY.

Witness:
Burr W. Jones

Patented May 11, 1937

2,080,018

UNITED STATES PATENT OFFICE 2,080,018

MAGNETIC ROTOR

Tullio Tognola, Sidney, N. Y., assignor to Bendix Aviation Corporation, South Bend, Ind., a corporation of Delaware Application February 27, 1936, Serial No. 66,076

7 Claims. (Cl. 171—209)

The present invention relates to magnetic rotors and more particularly to rotors for magneto generators of the type used for generating high tension ignition currents for internal combustion engines.

It is an object of the present invention to provide a novel multi-polar magneto rotor which is efficient in operation and simple and rugged in construction.

It is another object to provide such a device which employs a single magnet block of regular conformation which is adapted for economical commercial production.

It is a further object to provide such a device which efficiently utilizes the available magnetic flux and conserves the charge of the magnet block.

Further objects and advantages will be apparent from the following description taken in connection with the accompanying drawing in which.

Figure 1:
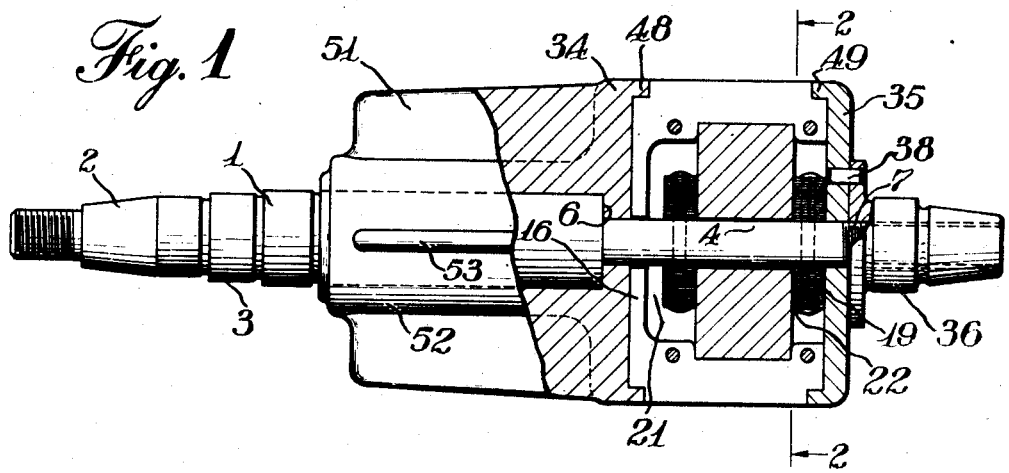
Fig. 1 is a side view partly in section of a preferred embodiment of the invention.
Figure 2:
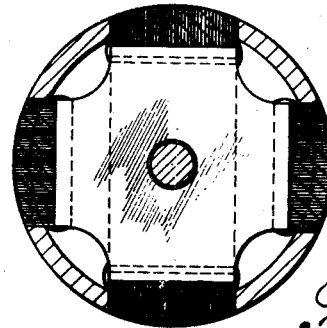
Fig. 2 is a transverse section taken substantially on the line 2—2 of Fig. 1.

Referring first to Fig. 1 of the drawing, there is illustrated a drive shaft 1 which is suitably formed as indicated at 2 for the reception of a driving member, not illustrated, and is provided with a bearing surface 3 adapted to be journalled in a suitable magneto casing.

The shaft 1, intermediate its length, is reduced in diameter as shown at 4, providing a shoulder 6 and terminating in a threaded portion 7. A magnet 8 (Fig. 3) in the form of a block or disc of material having high specific coercive force is adapted to be mounted loosely on the smooth portion 4 of shaft 1. The magnet block or disc 8 is provided with a plurality of poles which as here shown take the form of four projections 9, 11, 12 and 13 which give the magnet the form of a cross. The block is so magnetized that opposite poles are formed in sequence thereabout so that the diametrically opposite poles are similar. Thus, for instance, poles 9 and 12 may be north poles and poles 11 and 13 south poles.

Figure 3:
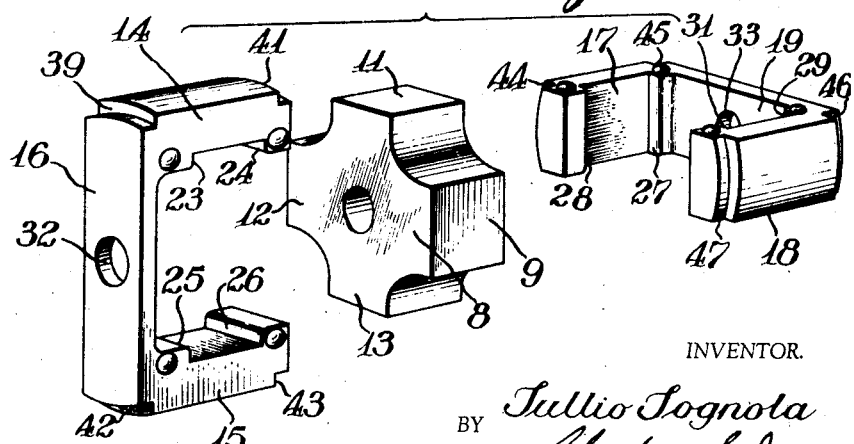
Fig. 3 is a detail in perspective of the magnet block with its pole members separated but indicating their operative relation.

Pole shoes of highly permeable material, preferably in laminated form, are formed in pairs connected by cross members arranged to embrace the magnet block. Thus, as best seen in Fig. 3, pole shoes 14 and 15, connected by an integral cross member 16, are arranged to embrace the poles 11 and 13 of the magnet disc, while pole shoes 17 and 18, connected by an integral cross member 19, are arranged at right angles to the pole shoes 14, 15 to embrace poles 9 and 12 of the magnet.

The cross members 16 and 19 are preferably spaced from the magnet disc as indicated at 21 and 22 in Fig. 1, the longitudinal position of the cross-overs being determined by the internal shoulders 23, 24, 25 and 26 on pole shoes 14 and 15 and 27, 28, 29 and 31 on pole shoes 17 and 18. Apertures 32 and 33 are provided in cross-overs 16 and 19 respectively to receive the reduced portion 4 of shaft 1.

In order to locate and retain the pole members 14, 15, 16 and 17, 18, 19 on the shaft 1, non-magnetic supporting members 34 and 35 in the form of discs or plates are mounted on the smooth portion 4 of said shaft, the supporing plate 34 being adapted to bear against the shoulder 6 on the shaft and the supporting plate 35 serving to clamp the pole members rigidly thereagainst by virtue of suitable clamping means in the form of a nut and bearing member 36 threaded on the portion 7 of shaft 1, and suitably locked in position as by means of a pin 38.

The pole members are preferably provided with circumferential rabbets 39, 41, 42, 43 and 44, 45, 46, 47, and supporting plates 34 and 35 are provided with circumferential flanges 48 and 49 adapted to enter said rabbets and thus more securely retain and unify the pole shoe members.

In order to facilitate cooling the device in use, circulating vanes 51 are preferably formed either integrally with the supporting plate 34 or molded thereon in any suitable way. As shown in Fig. 1, the plate 34 may be provided with an extended portion 52 in the form of a sleeve suitably keyed to the shaft 1 as indicated at 53.

In the operation of this device in a magneto, rotation thereof will cause flux from the magnet to intermittently traverse the external magnetic circuit of the magneto and thereby cause the generation of current in the usual manner. Since the opposite poles of the magnet block are connected by means of the external cross members 16 and 19, the effectiveness of the magnet is largely increased inasmuch as the effect of each pole is reenforced by the similar pole oppositely located with respect thereto. The cross members also assist in conserving the magnetic charge in the magnet since they maintain the magnetic circuits closed.

Although but one embodiment has been shown and described in detail, it will be understood that other embodiments are possible and various changes may be made in the design and construction of the parts without departing from the spirit of the invention as defined in the claims appended hereto.

What is claimed is:

1. In a magneto rotor a shaft, an integral multi-polar magnet, pole shoes of highly permeable material formed in pairs embracing said magnet alternately about its circumference, and non-magnetic supporting means anchoring said pole shoes and magnet to said shaft.

2. In a magneto rotor a shaft, an integral cross-shaped multi-polar magnet, pole shoes of highly permeable material formed in pairs with connecting arms embracing said magnet alternately about its circumference and connecting like poles thereof, and non-magnetic supporting means anchoring said pole shoes and magnet to said shaft.

3. In a magneto rotor a permanent multi-polar magnet in the form of a disc with circumferentially arranged poles, and cross members of highly permeable material embracing said magnet and connecting like poles thereof.

4. In a magneto rotor a permanent multi-polar magnet in the form of a disc with circumferentially arranged poles, and cross members of highly permeable material embracing the periphery of said magnet and connecting like poles thereof, the mid-portions of said cross members being spaced axially from the magnet, and the terminal portions forming pole shoes for the magnet.

5. In a magneto rotor a permanent multi-polar magnet in the form of a disc with circumferentially arranged poles, cross members of highly permeable material embracing the periphery of said magnet and connecting like poles thereof, and nonmagnetic supporting members clamping said cross members on the magnet and forming a rotatable unit therewith.

6. In a magneto rotor, a permanent magnet in the form of a disc with radially extending poles, pairs of pole shoes therefor of highly permeable material connected by cross members of the same material, said pole shoes having shoulders adjacent the ends thereof, non-magnetic retaining members having flanges adapted to engage said shoulders, and means for clamping said retaining members on the pole shoes and the pole shoes on the magnet.

7. In a magneto rotor a cross-shaped magnet block of steel having a high specific coercive force, and a pair of U-shaped members of highly permeable material embracing said magnet from opposite sides and at right angles to each other, the arms of said members forming pole shoes for the magnet and the bodies of said members forming paths of low reluctance connecting like magnetic poles.

TULLIO TOGNOLA.